United States Patent [19]

Belling

[11] Patent Number: 4,866,942

[45] Date of Patent: Sep. 19, 1989

[54] AUGMENTOR CURTAIN LINER FOR EQUALIZING PRESSURE THEREIN

[75] Inventor: Paul R. Belling, Woodstock, Conn.

[73] Assignee: The United States of America as represented by the Secretary of the Air Force, Washington, D.C.

[21] Appl. No.: 107,194

[22] Filed: Oct. 13, 1987

[51] Int. Cl.⁴ ............................................. F23R 3/44
[52] U.S. Cl. ..................................... 60/752; 60/39.32
[58] Field of Search ...................... 60/39.32, 752, 753, 60/759, 261

[56] References Cited

U.S. PATENT DOCUMENTS

| | | | |
|---|---|---|---|
| 2,544,538 | 3/1951 | Mahnken et al. | 60/39.32 |
| 2,794,319 | 6/1957 | Stockdale | 60/752 |
| 2,851,854 | 9/1958 | Doll, Jr. | |
| 2,874,536 | 2/1959 | Benson et al. | |
| 2,938,333 | 5/1960 | Wetzler | 60/261 |
| 3,826,088 | 7/1974 | Nash et al. | 60/261 |

Primary Examiner—Louis J. Casaregola
Assistant Examiner—Timothy S. Thorpe
Attorney, Agent, or Firm—Robert L. Nathans; Donald J. Singer

[57] ABSTRACT

An improved circumferential segmented augmentor liner assembly anchored to a cylindrical case of a jet engine includes a plurality of liner anchor members affixed to the cylindrical case at circumferentially spaced inside portions thereof, each member having a coupling device for coupling terminal side portions of a pair of adjacent liner segments to the coupling device along the length thereof, along with a plurality of apertures formed within each anchor member and positioned along the length thereof. Side portions of the liner segments are affixed to elongated rods, and each of the coupling devices includes a trough for containing a pair of rods, the trough being configured to anchor the rods and yet facilitate slidable removal of the rods to readily replace the liner segments.

1 Claim, 1 Drawing Sheet

AUGMENTOR CURTAIN LINER FOR EQUALIZING PRESSURE THEREIN

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of jet engine thrust augmentors.

Curtain liners are used in jet engine augmentors for military aircraft, and are positioned circumferentially about the afterburner or thrust augmentor, to separate the hot core gases from the cooler air flowing between the curtain liners and inside portions of an outer cylindrical engine case. Certain curtain liners divide the augmentor section into liner segments which are anchored to inside portions of the outer case. These circumferential segments will contain relatively high pressure cooling gases, and are thus subject to failure due to localized extremely high gas pressures during engine operation.

OBJECTS AND SUMMARY OF THE INVENTION

Accordingly, it is an object of the present invention to provide an assembly for reducing such liner segment failures by preventing the aforesaid buildup of extremely high localized static gas pressures at various portions of the liner assembly.

The present invention provides a simple, inexpensive, and reliable means for equalizing the static pressure within circumferential portions of the liner assembly between each liner segment and inside portions of the outer case which supports the liner segments by means of a plurality of anchor means. Preferably, a plurality of apertures are formed within each liner anchor, such apertures extending along the length of each anchor parallel to the longitudinal axis of the jet engine. The apertures pass completely through the walls of each anchor to equalize static gas pressure within adjacent portions of the assembly in a simple and reliable manner.

In accordance with another feature of the invention, liner curtain support rods may be quickly slidably removed from the anchors for replacing old liners with new ones.

BRIEF DESCRIPTION OF THE DRAWINGS

Other objects, features, and advantages of the present invention will become apparent upon study of the following description taken in conjunction with the drawings in which.

DETAILED DESCRIPTION OF THE PREFERRED EMBODIMENTS

Figure 1:
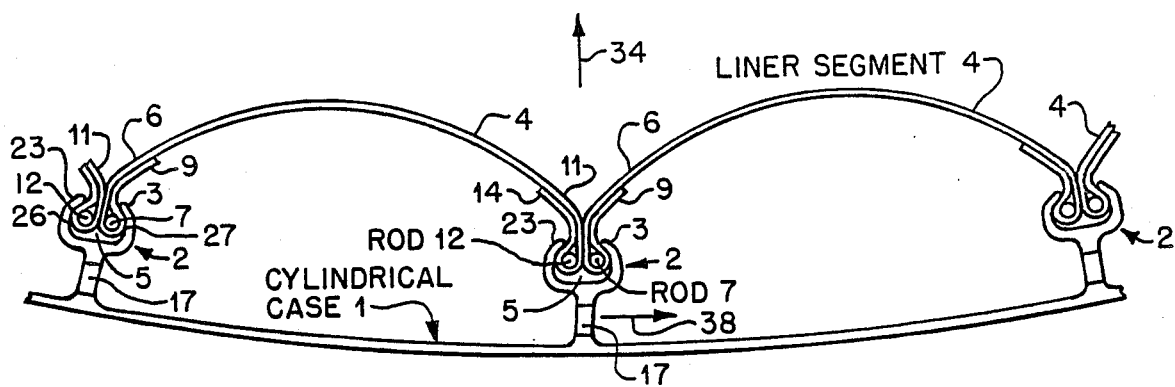
FIG. 1 illustrates in cross section A—A' components of the preferred liner assembly.

FIG. 1 illustrates a portion of the circumferential segmented liner assembly whereby liner segments 4 are coupled to inside portions of cylindrical case 1, via anchor coupling devices 2. First side portion 6 of liner segment 4 is affixed to rod 7 by means of wrapping side portion 6 about rod 7, so that extreme terminal portion 9 of segment 4 may be affixed to portion 6 in a conventional manner such as welding. Similarly, side portion 11 of adjacent liner segment 4 is wrapped about rod 12, and the extreme terminal liner portion 14 is affixed to side portion 11. The process of affixing side portions of the liner segments to the rods 7 and 12 is carried out before each pair of adjacent rods 7 and 12 rods are slipped or slidably inserted into end portion 31 of the anchor device 2. Upon completion of the insertion process, rods 7 and 12 will be positioned parallel to the elongated length of each anchor means and parallel to the longitudinal jet engine axis. In other words, the rods bearing side portions of the liner segments are moved upon insertion, in a direction perpendicular to the plane of the paper of FIG. 1, and in the direction indicated by arrow 33 shown in FIG. 2. Troughs 5, formed within the anchor devices 2 are configured as illustrated, in order to prevent motion of rods 7 and 12 upwardly in the direction indicated by arrow 34 in FIG. 1. Upper curved side portions 3 and 23 of each anchor device 2, maintain anchorage of each pair of rods within an associated anchor device. Thus, in accordance with a key feature of the invention, side portions 6 and 11 of adjacent liner segments may be easily and rapidly inserted within each anchor device 2, and yet may be readily removed for replacement purposes by sliding the pair of rods 7 and 12 parallel to the engine axis in the direction indicated by arrow 36. It may be noted that facing inside side portions 26 and 27 of trough 5 are separated from each other by a distance substantially equal to the sum of the diameters of rods 7 and 12, and yet permit sufficient clearance to contain the thin terminal liner segment portions.

Figure 2:
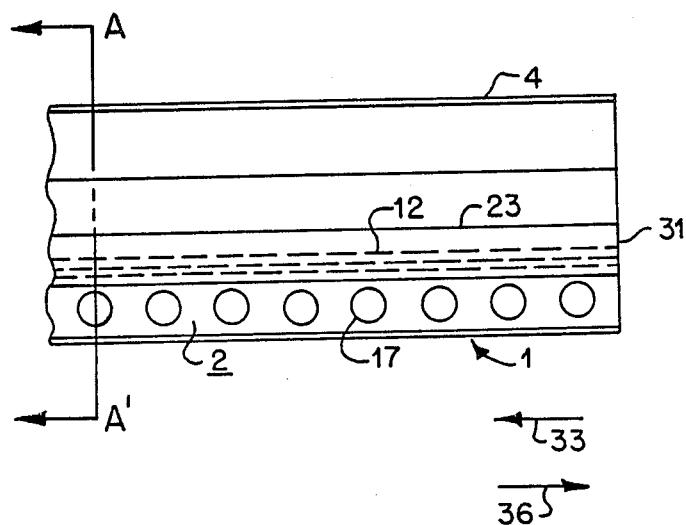
FIG. 2 illustrates the assembly as viewed along the length thereof parallel to the longitudinal axis of the jet engine.

Substantial equalization between gas pressure between the liner segments and case 1 is accomplished by forming gas conduit means within each of the anchor devices 2. The most preferred gas conduit means consists of a plurality of apertures 17 passing completely through each anchor device 2, and formed along the length of each elongated anchor device as indicated in FIG. 2. As may be seen from FIG. 1, apertures 17 are formed within each of the anchor devices, all of which are affixed to inside portions of case 1 all of the way around the cylindrical case. Let it be assumed that the static gas pressure under the left hand liner segment of FIG. 1 rapidly increases relative to the pressure under the right hand liner segment portion. A flow of gas would be produced within aperture 17 as indicated by arrow 38, and thus the pressures would be equalized. This process would be simultaneously carried out between all adjacent liner segment portions of the assembly, all the way around inside portions of the outer case. Thus this feature of the invention provides a simple and inexpensive mechanism for equalizing gas pressure within the liner segment assembly. Round apertures are preferred; however elongated slots or other shapes of apertures may be employed to carry out this function.

For example, the equalizing apertures may comprise a series of open areas separating a series of discrete anchor members extending along the case parallel to the longitudinal engine axis, rather than apertures formed within the anchor members.

What is claimed is:

1. In a jet engine having a longitudinal engine axis, an improved circumferential segmented augmentor liner assembly anchored to a cylindrical case of said engine comprising:

a plurality of liner anchor means affixed to said cylindrical case at circumferentially spaced inside portions thereof, each anchor means having coupling means for coupling terminal side portions of a pair of adjacent liner segments to said coupling means along the length thereof extending parallel to said longitudinal engine axis; and wherein said side portions of said liner segments are affixed to elongated rods, and each of said coupling means includes trough means for containing a pair of said rods, said trough means being configurated to anchor said rods to said anchor means during operation of said jet engine and yet facilitate slidable removal of said rod from said trough means in order to readily replace said liner segments; and wherein said trough means is configured to surround substantial portions of said pair of said rods to maintain the rods positioned within said trough; and wherein inner said portions of said trough means are separated by a distance substantially equal to the sum of the diameters of each rod of said pair of rods; and a plurality of gas conduit apertures passing completely through each anchor means for providing substantial equalization of gas pressure only between said liner segments and said cylindrical case.

* * * * *